(12) United States Patent
Baraggia Au Yeung et al.

(10) Patent No.: US 11,391,364 B2
(45) Date of Patent: Jul. 19, 2022

(54) GEAR ASSEMBLY FOR AERONAUTICAL ENGINE WITH COLLECTOR

(71) Applicant: GE Avio S.r.l., Rivalta di Torino (IT)

(72) Inventors: Saypen Baraggia Au Yeung, Valenza (IT); Pietro Molesini, Castelnuovo del Garda (IT); Fabio De Bellis, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/009,021

(22) Filed: Sep. 1, 2020

(65) Prior Publication Data
US 2021/0062910 A1  Mar. 4, 2021

(30) Foreign Application Priority Data

Sep. 3, 2019 (IT) .................. 102019000015515

(51) Int. Cl.
*F16H 1/28* (2006.01)
*F16H 57/04* (2010.01)
*F01D 25/18* (2006.01)
*F02C 7/36* (2006.01)

(52) U.S. Cl.
CPC ......... *F16H 57/0486* (2013.01); *F01D 25/18* (2013.01); *F02C 7/36* (2013.01); *F16H 1/28* (2013.01); *F16H 57/0427* (2013.01); *F16H 57/0431* (2013.01); *F16H 57/0479* (2013.01)

(58) Field of Classification Search
CPC ............. F16H 57/0486; F16H 57/0427; F16H 57/0431; F16H 57/0479; F01D 25/18
See application file for complete search history.

(56) References Cited

U.S. PATENT DOCUMENTS 4,271,928 A   6/1981  Northern
4,976,335 A  12/1990  Cappellato
(Continued)

FOREIGN PATENT DOCUMENTS

CN   201626552 U   11/2010
EP      2559913 A1   2/2013
(Continued)

OTHER PUBLICATIONS

Italian Search Report Corresponding to IT201900015515 dated Feb. 18, 2020.

*Primary Examiner* — Derek D Knight
(74) *Attorney, Agent, or Firm* — Venable LLP; Michele V. Frank

(57) ABSTRACT

A gear assembly for an aeronautical engine that includes a first gear disposed at a centerline axis of the gear assembly; a second gear coupled to the first gear in adjacent radial arrangement to form a first mesh between the first gear and the second gear; a third gear coupled to the second gear in adjacent radial arrangement to form a second mesh between the second gear and the third gear; a collector rotatably coupled with the third gear; and a lubricant input portion disposed between a portion of the first gear and the second gear such that a first supply opening of the lubricant input portion is directed at the first mesh between the first gear and the second gear. The first supply opening provides a flow of lubricant to the first mesh with a portion of the flow of lubricant is collected by the collector.

12 Claims, 4 Drawing Sheets

(56) References Cited

U.S. PATENT DOCUMENTS

| | | | |
|---|---|---|---|
| 6,039,667 A * | 3/2000 | Schunck | F16H 57/0427 |
| | | | 184/11.4 |
| 6,223,616 B1 | 5/2001 | Sheridan | |
| 7,651,049 B2 | 1/2010 | Carnelli et al. | |
| 8,020,665 B2 | 9/2011 | Sheridan et al. | |
| 8,215,454 B2 * | 7/2012 | Portlock | F16N 17/06 |
| | | | 184/6.12 |
| 8,777,792 B2 * | 7/2014 | Imai | F16H 57/0486 |
| | | | 475/159 |
| 8,820,478 B2 * | 9/2014 | Gauthier | F02C 3/107 |
| | | | 184/6.12 |
| 8,920,283 B2 | 12/2014 | Richards | |
| 8,944,216 B2 | 2/2015 | Rollins et al. | |
| 8,985,278 B2 * | 3/2015 | Xu | F01D 25/20 |
| | | | 184/6.11 |
| 9,260,980 B2 | 2/2016 | Leese | |
| 9,404,420 B2 * | 8/2016 | Gallet | F16H 57/0456 |
| 9,541,007 B2 | 1/2017 | McCune et al. | |
| 9,803,743 B2 | 10/2017 | Brault et al. | |
| 9,976,444 B2 | 5/2018 | NguyenLoc et al. | |
| 10,066,734 B2 | 9/2018 | Sheridan | |
| 10,808,625 B2 * | 10/2020 | Yoshitomi | F16H 57/0456 |
| 11,022,209 B2 * | 6/2021 | Baraggia Au Yeung | |
| | | | F16H 57/0409 |
| 2013/0102432 A1 | 4/2013 | Imai et al. | |
| 2014/0255162 A1 | 9/2014 | DiBenedetto | |
| 2016/0047281 A1 | 2/2016 | Bastian | |
| 2016/0123457 A1 | 5/2016 | Harreau | |
| 2016/0363208 A1 | 12/2016 | Louis | |
| 2017/0138460 A1 | 5/2017 | Beque et al. | |
| 2018/0216489 A1 | 8/2018 | Curlier et al. | |
| 2019/0078680 A1 | 3/2019 | Edwards et al. | |

FOREIGN PATENT DOCUMENTS

| | | |
|---|---|---|
| EP | 3453924 A1 | 3/2019 |
| RU | 2108510 C1 | 4/1998 |

* cited by examiner

GEAR ASSEMBLY FOR AERONAUTICAL ENGINE WITH COLLECTOR

GOVERNMENT SPONSORED RESEARCH

The project leading to this application has received funding from the Clean Sky 2 Joint Undertaking under the European Union's Horizon 2020 research and innovation program under grant agreement No. CS2-LPA-GAM-2018/2019-01.

PRIORITY INFORMATION

The present application claims priority to Italian Patent Application No. 102019000015515 filed on Sep. 3, 2019.

FIELD

The present subject matter relates generally to a gear drive system, or more particularly to a gear drive system including a gear assembly with a lubricant recirculating collector.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Mechanical and electro-mechanical systems, such as gas turbine engines or other engines, include gear assemblies to change an input or output rotational speed between two or more shafts such as to optimize turbine engine efficiency and performance. Gear assemblies are also used to move accessories and/or propellers or rotors. For example, gear assemblies are used to decouple turbine and fan shafts in turbofan engines and are used to decouple a gas turbine from a propeller in turboprop engines.

Lubricant systems for such gear assemblies are designed to supply lubricant injected into gear meshes. However, a primary lubrication system may be interrupted from providing a lubricant to the gear assembly for several seconds, e.g., an oil interruption event, or longer times, e.g., an oil off event. To avoid gear and bearing failure or damage, additional parts are needed such as auxiliary systems to provide lubricant during such interruption periods.

BRIEF DESCRIPTION

Aspects and advantages of the invention will be set forth in part in the following description, or may be obvious from the description, or may be learned through practice of the invention.

In one exemplary embodiment of the present disclosure, a gear assembly is provided. The gear assembly includes a first gear disposed at a centerline axis of the gear assembly; a second gear coupled to the first gear in adjacent radial arrangement to form a first mesh between the first gear and the second gear; a third gear coupled to the second gear in adjacent radial arrangement to form a second mesh between the second gear and the third gear; a collector rotatably coupled with the third gear; and a lubricant input portion disposed between a portion of the first gear and the second gear such that a first supply opening of the lubricant input portion is directed at the first mesh between the first gear and the second gear, wherein the first supply opening provides a flow of lubricant to the first mesh between the first gear and the second gear and a portion of the flow of lubricant is collected by the collector.

In certain exemplary embodiments the gear assembly includes a recirculation channel in communication with the collector and the lubricant input portion.

In certain exemplary embodiments the lubricant input portion includes a second supply opening directed at the first mesh between the first gear and the second gear, and the recirculation channel is in communication with the collector and the second supply opening of the lubricant input portion.

In certain exemplary embodiments the second gear is rotatably mounted to a carrier via a bearing, the carrier is fixed with respect to the first gear, the recirculation channel is disposed within the carrier, and the third gear and the collector are rotatable relative to the carrier.

In certain exemplary embodiments the flow of lubricant collected within the collector is continuously recirculated through the recirculation channel and out the second supply opening of the lubricant input portion via a relative velocity between the third gear and the carrier.

In certain exemplary embodiments the gear assembly includes a primary lubrication system transitionable between a working condition in which the flow of lubricant is provided to the first supply opening and an interruption condition in which the flow of lubricant is interrupted from being provided to the first supply opening, wherein during the interruption condition, the flow of lubricant collected within the collector is recirculated through the recirculation channel and out the second supply opening of the lubricant input portion.

In certain exemplary embodiments the gear assembly includes an output shaft coupled to the third gear, wherein the collector is coupled to a portion of the output shaft.

In certain exemplary embodiments the lubricant input portion includes a first duct having the first supply opening and a second duct having the second supply opening, wherein the first duct and the second duct are separate.

In another exemplary embodiment of the present disclosure, a gear assembly is provided. The gear assembly includes a first gear disposed at a centerline axis of the gear assembly; a second gear coupled to the first gear in adjacent radial arrangement to form a first mesh between the first gear and the second gear; a third gear coupled to the second gear in adjacent radial arrangement to form a second mesh between the second gear and the third gear; a collector rotatably coupled with the third gear; a lubricant input portion disposed between a portion of the first gear and the second gear such that a supply opening of the lubricant input portion is directed at the first mesh between the first gear and the second gear; and a recirculation channel in communication with the collector and the lubricant input portion, wherein the supply opening provides a flow of lubricant to the first mesh between the first gear and the second gear and a portion of the flow of lubricant is collected by the collector.

In certain exemplary embodiments the second gear is rotatably mounted to a carrier via a bearing, wherein the carrier is fixed with respect to the first gear, and wherein the recirculation channel is disposed within the carrier.

In certain exemplary embodiments the gear assembly includes a valve operable between a first position in which the recirculation channel is not in fluid communication with the supply opening of the lubricant input portion and a second position in which the recirculation channel is in fluid communication with the supply opening of the lubricant input portion and the flow of lubricant collected within the collector is recirculated through the recirculation channel and out the supply opening of the lubricant input portion via a relative velocity between the third gear and the carrier.

In certain exemplary embodiments the gear assembly includes a primary lubrication system in communication with the gear assembly, the primary lubrication system transitionable between a working condition in which the flow of lubricant is provided to the supply opening and an interruption condition in which the flow of lubricant is interrupted from being provided to the supply opening.

In certain exemplary embodiments with the primary lubrication system in the working condition, a pressure of the flow of lubricant provided to the supply opening maintains the valve in the first position.

In certain exemplary embodiments with the primary lubrication system in the interruption condition, the pressure of the flow of lubricant provided to the supply opening decreases thereby transitioning the valve to the second position.

In certain exemplary embodiments the second gear is rotatably mounted to a carrier via a bearing, and the carrier and the third gear are rotating.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
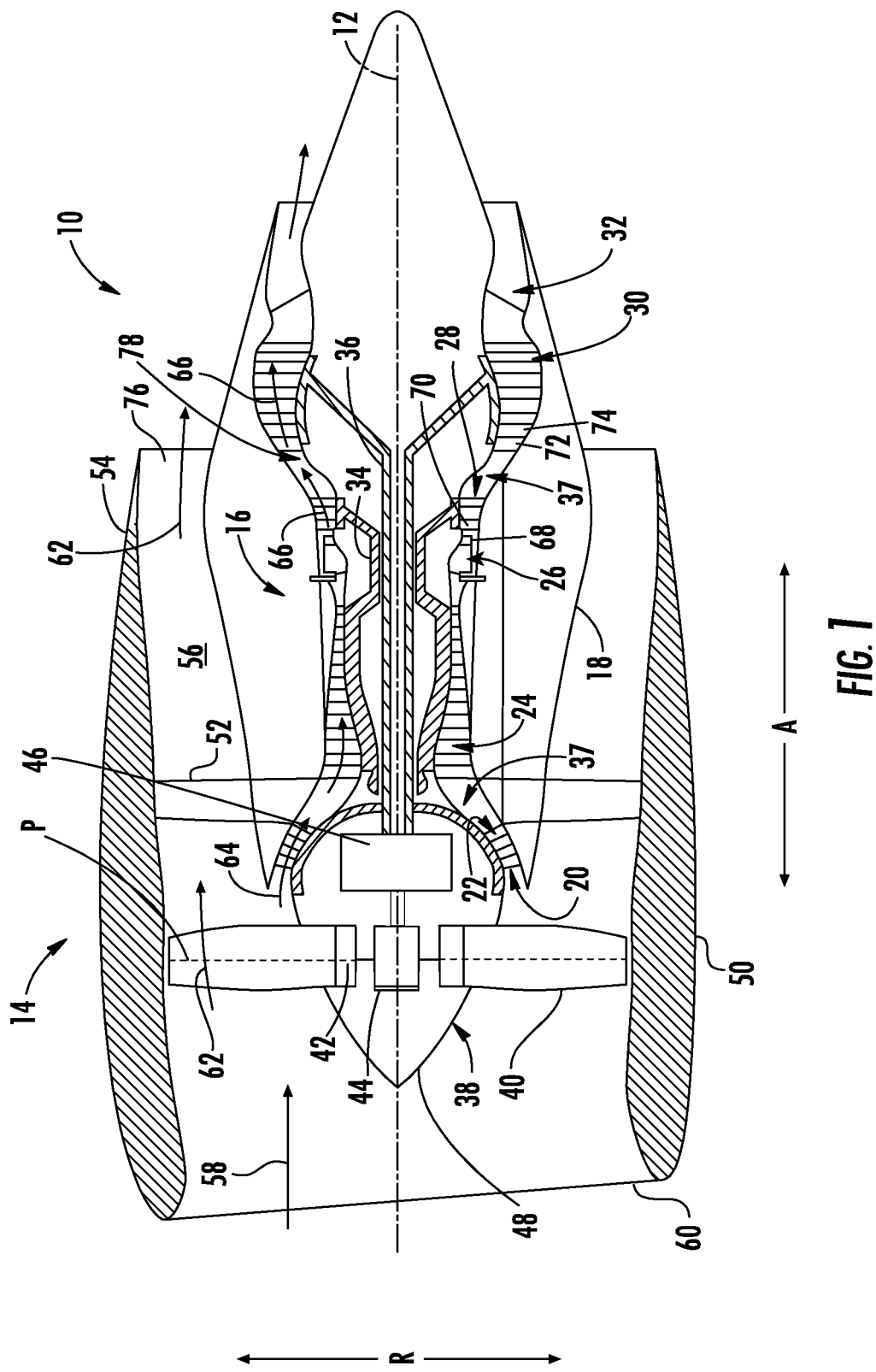
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Epicyclic gearboxes integrated in modern aeroengines require continuous lubrication to transmit power. In special off-design or interruption conditions, a lubrication supply may be interrupted for several seconds or more. To avoid gear and bearing failure or damage, conventional systems use additional auxiliary systems. However, such additional systems require dedicated hardware and/or pre-flight filling/discharging activities to operate. A gear assembly of the present disclosure utilizes a collector rotating with a third gear or ring gear coupled with a recirculation channel to recover and recirculate a flow of lubricant for lubrication of a gear assembly, e.g., an epicyclic gearbox, for a few seconds during interruption conditions. In this manner, a gear assembly of the present disclosure provides lubrication during interruption conditions without requiring any external connections or additional parts as are needed in conventional systems.

A gear assembly of the present disclosure provides a system for collecting and storing a lubricant during a working condition of a primary lubrication system in which a flow of lubricant is provided to a supply opening of a lubricant input portion. For example, during a working condition of the primary lubrication system, a flow of lubricant travels through a supply channel and out a supply opening of a lubricant input portion to a first mesh between a first gear and a second gear. Next, a portion of the flow of lubricant is collected by a collector of the present disclosure. The recovered flow collected by the collector is then recirculated from the collector through a recirculation channel and out a supply opening of the lubricant input portion via a relative velocity between the third gear and a carrier. In this manner, a gear assembly of the present disclosure is capable of storing a portion of the flow of lubricant during a working condition of a primary lubrication system within the collector for subsequent use to lubricate the system, e.g., during an interruption condition. In one embodiment, a gear assembly of the present disclosure allows a flow of lubricant collected within the collector to be continuously recirculated through the recirculation channel and out the second supply opening of the lubricant input portion.

A gear assembly of the present disclosure may also include a valve that is operable between a first position in which the recirculation channel is not in fluid communication with the supply opening of the lubricant input portion and a second position in which the recirculation channel is in fluid communication with the supply opening of the lubricant input portion and the flow of lubricant collected within the collector is recirculated through the recirculation channel and out the supply opening of the lubricant input portion via a relative velocity between the third gear and the carrier. In this manner, the valve makes sure the recovered flow of lubricant is only provided out the supply opening of the lubricant input portion with the primary lubrication system in an interruption condition.

A gear assembly of the present disclosure is able to continuously lubricate the gears and meshes of a gear system during an interruption condition of the primary lubrication system without requiring additional parts, auxiliary systems, and/or tanks.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." Although FIG. 1 illustrates a turbofan configuration, a gear assembly of the present disclosure is compatible with other configurations, such as a turboprop or other configurations, as described below. As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14. In an exemplary embodiment, the engine 10 includes a gear assembly or power gear box 46 having a plurality of gears for decoupling a gas turbine shaft from a fan shaft. The position of the power gear box 46 is not limited to that as shown in the exemplary embodiment of turbofan 10. For example, the position of the power gear box 46 may vary along the axial direction A.

In other exemplary embodiments, a gear assembly of the present disclosure may be included in a turboprop configuration, wherein a gear box decouples a gas turbine from a propeller.

It is also contemplated that a gear assembly of the present disclosure is able to be utilized in any mechanical or electro-mechanical system, such as gas turbine engines, piston engines, turbofan engines, turboprop engines, other gear drive systems, and/or rotor drive systems.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Other embodiments may feature different turbomachine configurations. For example, an LP turbine that is not directly connected to an LP compressor, e.g., in a decoupling gear box configuration. Additionally, the compressor section, combustion section 26, and turbine section together define at least in part a core air flowpath 37 extending therethrough.

A gear assembly of the present disclosure is compatible with standard fans, variable pitch fans, or other configurations. For the embodiment depicted, the fan section 14 may include a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a gear assembly or power gear box 46. A gear assembly 46 may enable a speed change between a first shaft, e.g., LP shaft 36, and a second shaft, e.g., LP compressor shaft and/or fan shaft. For example, in one embodiment, the gear assembly 46 may be disposed in an arrangement between a first shaft and a second shaft such as to reduce an output speed from one shaft to another shaft.

More generally, the gear assembly 46 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan, or it is required to do so due to technology limits, e.g., propeller tip speed in turboprops require much lower speed with respect to gas turbine shafts speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, an engine of the present disclosure may be part of an airplane engine or a helicopter engine. In other exemplary embodiments, any other suitable engine may be utilized with a gear assembly of the present disclosure. For example, in other embodiments, the engine may be any other suitable gas turbine engine, such as a turbofan engine, turboprop engine, turbojet engine, any other suitable turboshaft engine, etc. In such a manner, it will further be appreciated that in other embodiments the gas turbine engine may have any other suitable configuration, such as any other suitable number or arrangement of shafts, compressors, turbines, fans, etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of combustion engine, such as reciprocating engines.

Figure 2:
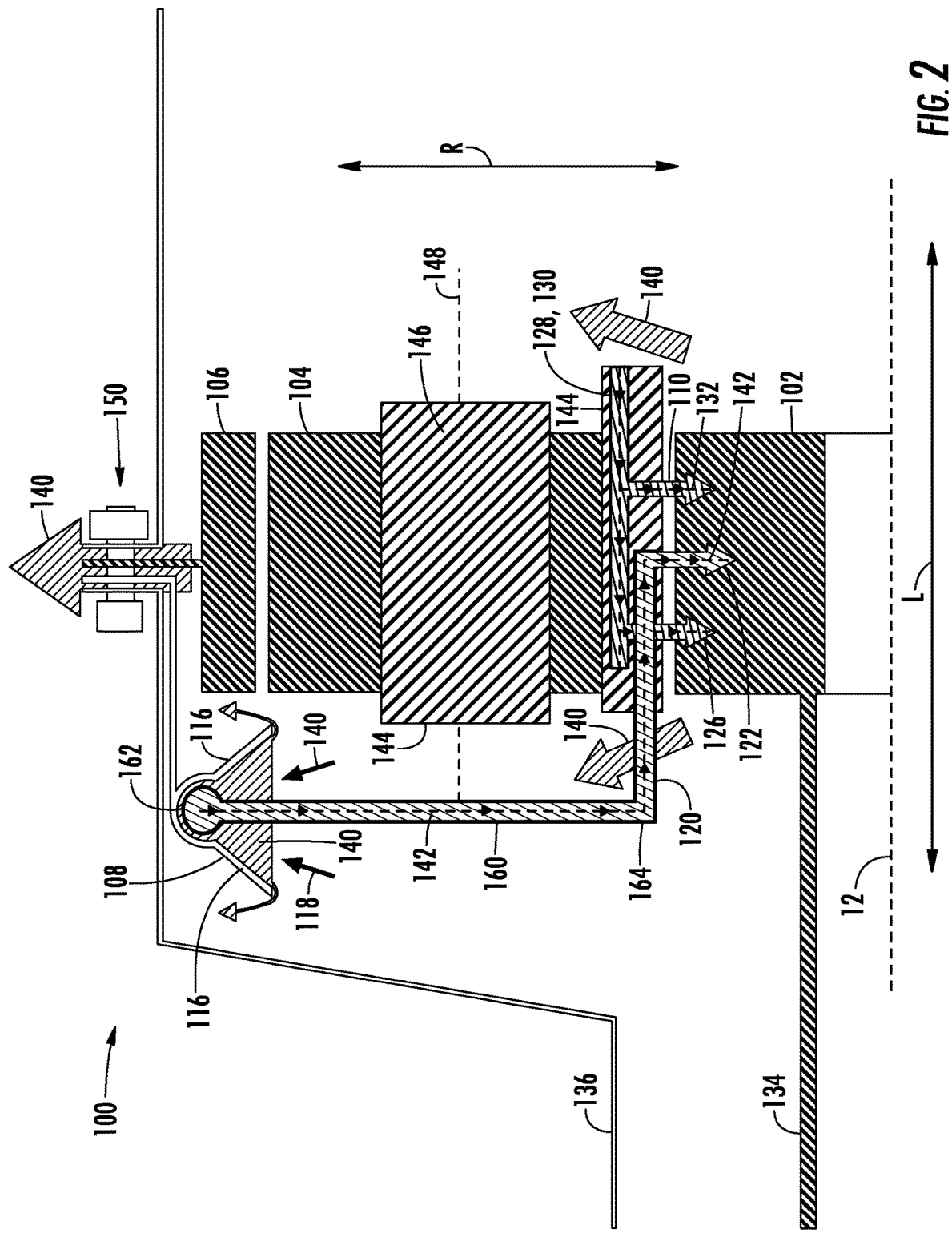
FIG. 2 is a schematic, side cross-sectional view of a gear assembly in accordance with an exemplary embodiment of the present disclosure.
Figure 3:
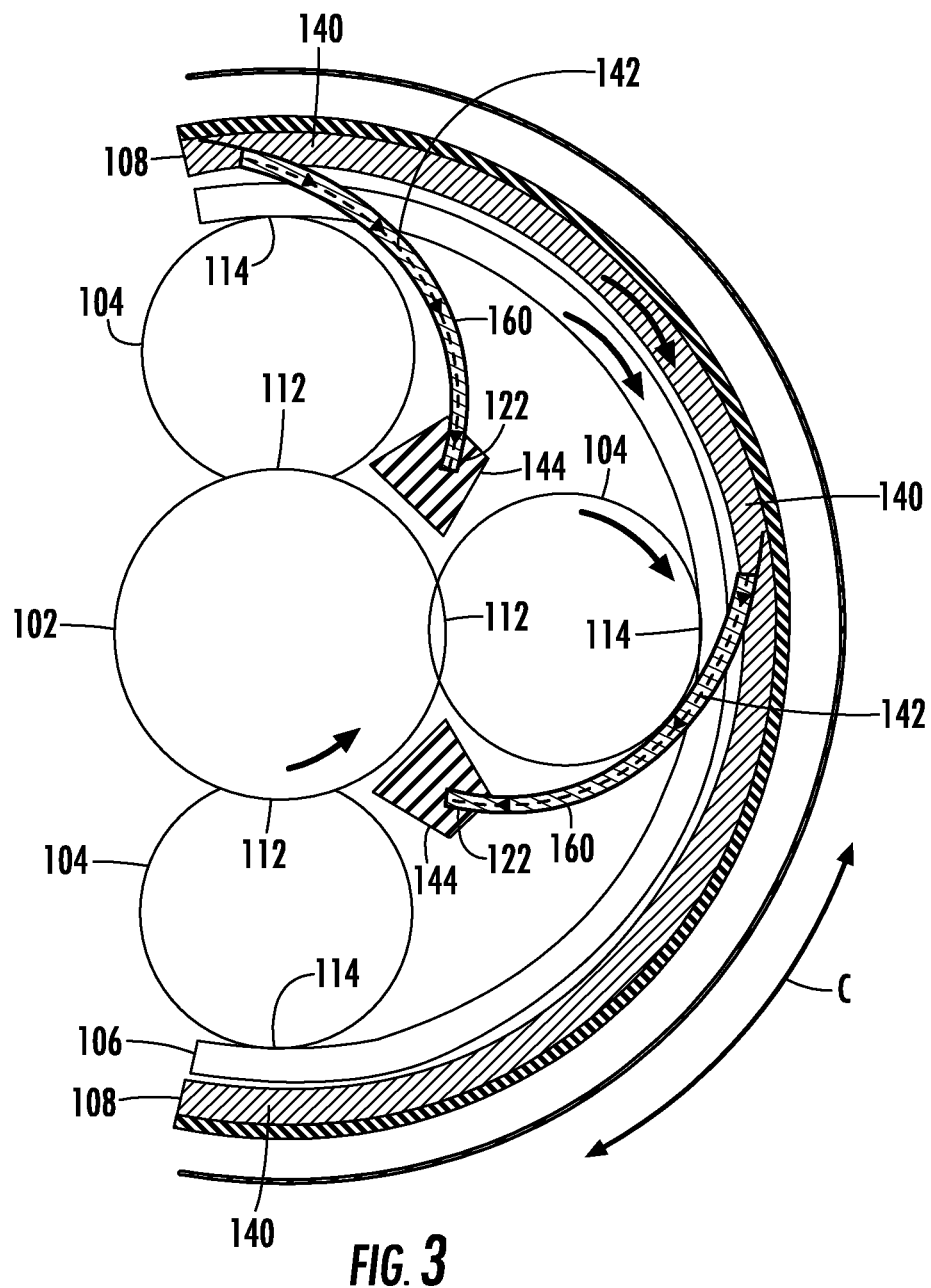
FIG. 3 is a schematic, front view of a gear assembly in accordance with an exemplary embodiment of the present disclosure.

Referring now to FIGS. 2-3, a schematic drawing of a gear assembly 100 for an aeronautical engine, e.g., a gas turbine engine, in accordance with an exemplary embodiment of the present disclosure is provided. In at least certain exemplary embodiments, the exemplary gear assembly 100 depicted in FIGS. 2-3 may be incorporated into, e.g., the exemplary engine 10 described above with reference to FIG. 1 (e.g., may be incorporated into the gear assembly 46 depicted in FIG. 1 and described above, or in other positions along the axial direction A depending on the turbofan engine architecture, or in other configurations such as turboprop engines, or other gear drive systems).

Referring to FIGS. 2-3, an exemplary embodiment of a gear assembly 100 according to an aspect of the present disclosure is provided. FIG. 2 provides a longitudinal side view of a gear assembly 100 of the present disclosure and FIG. 3 provides a circumferential view of the gear assembly 100 of the present disclosure. The gear assembly 100 defines a longitudinal direction L co-directional to a reference longitudinal centerline axis 12 extended through the gear assembly 100. A reference radial direction R is extended from the centerline axis 12. A reference circumferential direction C is extended relative to the centerline axis 12. FIGS. 2-3 schematically show a portion of a gear assembly 100 of the present disclosure.

Referring to FIGS. 2-3, in an exemplary embodiment, a gear assembly 100 of the present disclosure generally includes a first gear 102, a second gear 104, a third gear 106, a collector 108, a lubricant input portion 110, and a carrier portion 144. In one exemplary embodiment, the lubricant input portion 110 may include a spraybar 110. In other exemplary embodiments, the lubricant input portion 110 may include other configurations and assemblies for supplying a lubricant to the gear assembly 100.

In one embodiment, the first gear 102 is disposed at the centerline axis 12 of the gear assembly 100. The second gear 104 is coupled to the first gear 102 in adjacent arrangement along the radial direction R to form a first mesh 112 (FIG. 3) between the first gear 102 and the second gear 104. The third gear 106 is coupled to the second gear 104 in adjacent arrangement along the radial direction R to form a second mesh 114 (FIG. 3) between the second gear 104 and the third gear 106.

Referring to FIG. 2, in an exemplary embodiment, the gear assembly 100 includes a lubricant input portion 110 disposed between a portion of the first gear 102 and the second gear 104 such that a first supply opening 126 of the lubricant input portion 110 is directed at the first mesh 112 (FIG. 3) between the first gear 102 and the second gear 104. In one embodiment, the lubricant input portion 110 includes a supply opening 126 in communication with a supply channel or first duct 128. The supply channel 128 forms a primary lubrication system 130 that supplies a flow of lubricant 132, i.e., an inlet flow of lubricant indicated by arrows 132, through the supply channel 128 to the supply opening 126 during a working condition of the primary lubrication system 130. In an exemplary embodiment, the lubricant 132 is an oil or similar lubricant. In one embodiment, a primary lubrication system 130 is transitionable between a working condition in which the flow of lubricant 132 is provided to the first supply opening 126 and an interruption condition in which the flow of lubricant 132 is interrupted from being provided to the first supply opening 126.

Referring to FIG. 2, in one embodiment, the lubricant input portion 110 includes the first duct or supply channel 128 including the first supply opening 126 and a second duct or second channel 120 including a second supply opening 122. In an exemplary embodiment, the first duct 128 and the second duct 120 are separate as shown in FIG. 2. Referring to FIG. 2, the second supply opening 122 of the lubricant input portion 110 is directed at the first mesh 112 (FIG. 3) between the first gear 102 and the second gear 104. It is contemplated that the lubricant input portion 110 includes more than one supply opening 126 as shown in FIG. 2. It is also contemplated that the lubricant input portion 110 may include more than one second supply opening 122. For example, the lubricant input portion 110 may include any number of supply openings 122, 126 to provide an appropriate amount of lubrication for a particular application.

Referring to FIGS. 2-3, in an exemplary embodiment, a collector 108 is rotatably coupled with the third gear 106. The collector 108 is sized and shaped to collect a portion of the flow of lubricant 132, i.e., an inlet flow of lubricant indicated by arrows 132, provided through the supply opening 126 of the lubricant input portion 110 during a working condition of the primary lubrication system 130. In one embodiment, the collector 108 includes opposing sidewalls 116 that form a collection region 118. In an exemplary embodiment, the sidewalls 116 and collection region 118 form a collection trough that collects a portion of the flow of lubricant 132, i.e., an inlet flow of lubricant indicated by arrows 132, provided through the supply opening 126 of the lubricant input portion 110 during a working condition of the primary lubrication system 130. In one embodiment, the sidewalls 116 are tapered towards the collection region 118 to form collection and guide surfaces that first collect the flow of lubricant 132 and then guide the flow of lubricant 132 to the collection region 118 of the collector 108. Referring to FIGS. 2 and 3, in one embodiment, the collector 108 forms a collection channel or trough that extends circumferentially around the first gear 102 and the second gears 104 and is rotatably coupled with the third gear 106.

Referring to FIG. 3, in an exemplary embodiment, a gear assembly 100 of the present disclosure may include a plurality of second gears 104 coupled to the first gear 102. Referring to FIG. 2, in an exemplary embodiment, the gear assembly 100 further includes a first shaft 134 coupled to the first gear 102. The first shaft 134 may be defined substantially concentric to the centerline axis 12. The gear assembly 100 further includes a second shaft 136. In one embodiment, the first shaft 134 is an input shaft and the second shaft 136 is an output shaft.

Figure 4:
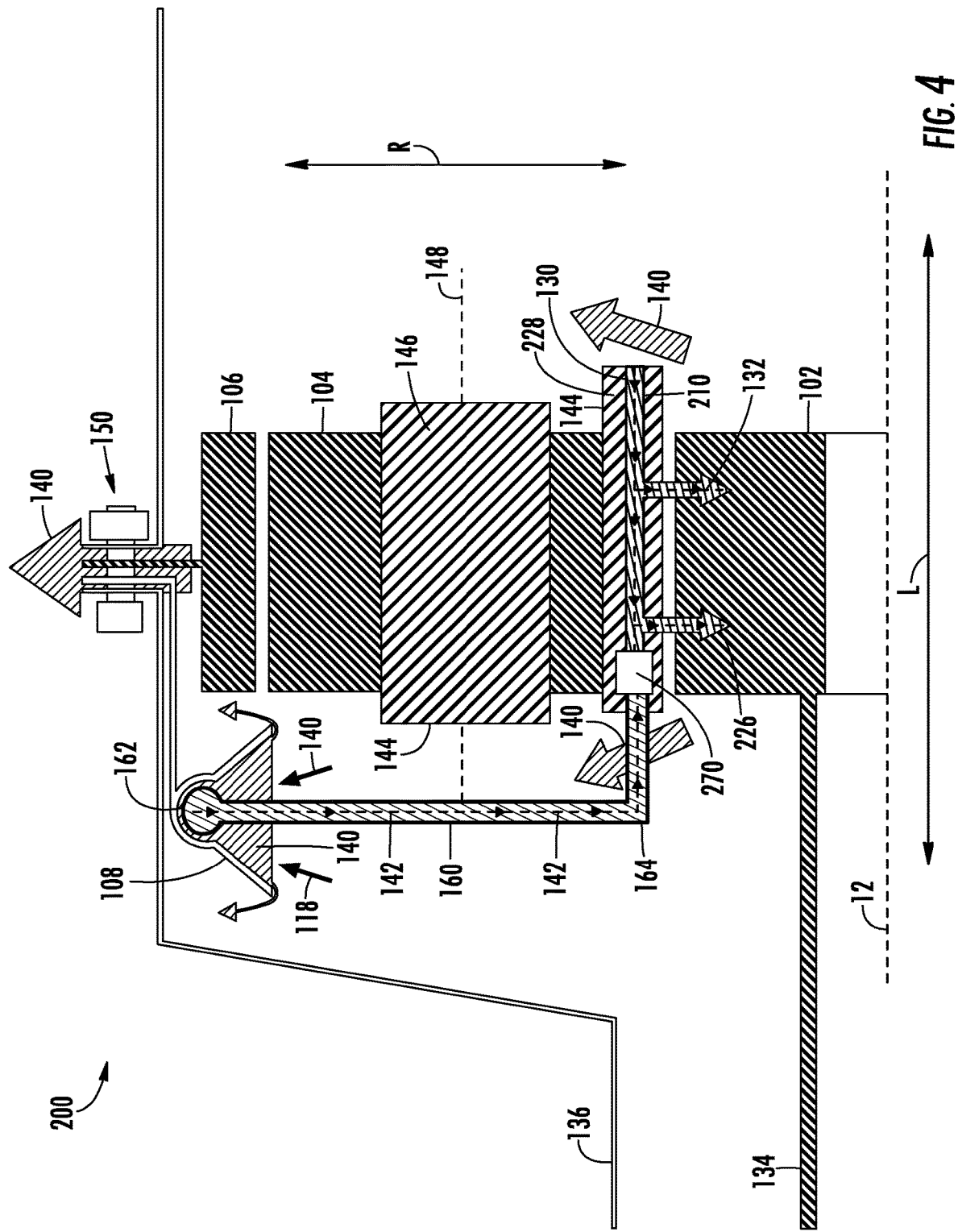
FIG. 4 is a schematic, side cross-sectional view of a gear assembly in accordance with another exemplary embodiment of the present disclosure.

Referring to FIGS. 2-3, in one exemplary embodiment, the gear assembly 100 further includes a carrier portion 144 and each second gear 104 is rotatably mounted on a portion of a carrier, e.g., a journal bearing or pin 146. As such, rotation of the first shaft 134 and the first gear 102 enables rotation of each second gear 104 around a respective second gear axis 148. Furthermore, in some embodiments, rotation of the second gear axis 148 around the first gear 102, i.e., around the centerline axis 12, may be enabled. Referring to FIGS. 2-4, the schematic views illustrated for gear assemblies of the present disclosure do not show the entirety of the carrier portion of the gear assemblies. The gear assemblies of the present disclosure are compatible with and utilize standard carrier configurations known in the art.

In one exemplary embodiment, the first gear 102 is a sun gear rotatable around the centerline axis 12 of the gear assembly 100, the second gear 104 is a planet gear coupled to the sun gear, and the third gear 106 is a ring gear coupled to the planet gear. In one embodiment, the gear assembly 100 forms a part of a star gear system. In other embodiments, the gear assembly 100 may form other planetary gear systems including different gear architectures.

In such an embodiment, a gear carrier, e.g., carrier portion 144, of the gear assembly 100 is mechanically grounded, the ring gear or third gear 106 is rotatable and the output shaft 136 extends from the ring gear or third gear 106. Because the carrier portion 144 is grounded, the planet gears or second gears 104 cannot orbit the sun gear or first gear 102 and therefore are referred to as star gears 104. In operation, the input shaft 134 rotatably drives the sun gear or first gear 102, compelling each star gear or second gear 104 to rotate about its own axis, i.e., a respective second gear axis 148. In an exemplary embodiment, each second gear 104 is rotatably mounted on a portion of a carrier, e.g., a journal bearing or pin 146. The rotary motion of the star gears or second gears 104 turn the ring gear or third gear 106, and hence the output shaft 136, in a direction opposite that of the input shaft 134.

In another exemplary embodiment of the present disclosure, the gear assembly 100 may include a portion of the carrier 144 rotating and the third gear 106 rotating.

Referring to FIG. 2, in an exemplary embodiment, the output shaft 136 is coupled to the third gear 106 and a flange 150 is disposed at a portion of the output shaft 136. Referring still to FIG. 2, in one embodiment, the collector 108 is coupled to a portion of the output shaft 136. In other embodiments, the collector 108 may be coupled to other portions of the gear assembly 100. For example, in one embodiment, referring to FIG. 2, the collector 108 is coupled to a portion of the flange 150.

Referring to FIGS. 2-3, in an exemplary embodiment, the gear assembly 100 includes a recirculation channel 160 in communication with the collector 108 and the lubricant input portion 110. For example, in one embodiment, the recirculation channel 160 includes a first end 162 in fluid communication with the collection region 118 of the collector 108 and a second end 164 in fluid communication with a portion of the lubricant input portion 110, e.g., the second supply opening 122 of the second duct 120 of the lubricant input portion 110. In an exemplary embodiment, the recirculation channel 160 of the present disclosure is sized and configured to provide a specific recovered lubricant flow rate through the recirculation channel 160 and out the second supply opening 122 to lubricate a first mesh 112 between the first gear 102 and the second gear 104 for particular applications.

As discussed above, the second gear 104 is rotatably mounted to a carrier portion 144 via a journal bearing or pin 146 and the carrier portion 144 is mechanically grounded, e.g., the carrier portion 144 is fixed with respect to the first gear 102. In an exemplary embodiment, the recirculation channel 160 is disposed within a portion of the carrier 144. Referring to FIG. 3, in an exemplary embodiment, the gear assembly 100 includes a plurality of recirculation channels 160 in communication with different portions of the collector 108 as described in more detail below. In an exemplary embodiment of the present disclosure, the third gear 106 and the collector 108 are each rotatable relative to the carrier 144. In one embodiment, the third gear 106 and the collector 108 each rotate relative to the carrier 144 at the same speed.

Referring to FIGS. 2-3, a flow of lubricant 132 being provided to the gear assembly 100 will now be discussed. In an exemplary embodiment, the supply opening 126 of the lubricant input portion 110 provides a flow of lubricant 132, i.e., an inlet flow of lubricant indicated by arrows 132, to the first mesh 112 between the first gear 102 and the second gear 104. Next, a portion of the lubricant after contacting the first mesh 112 between the first gear 102 and the second gear 104 flows to and is collected by the collector 108, e.g., a scavenger flow of lubricant indicated by arrows 140 to the collector 108. For example, during a working condition of the primary lubrication system 130, a flow of lubricant 132 travels through the supply channel 128 and out the supply opening 126 of the lubricant input portion 110 to the first mesh 112 between the first gear 102 and the second gear 104. Next, a portion of the scavenger flow of lubricant 140 flows into the collector 108 via centrifugal force and windage effects between the first gear 102 and the second gear 104. In this manner, the gear assembly 100 of the present disclosure is capable of storing a portion of the flow of lubricant 140 during a working condition of the primary lubrication system 130 within the collector 108 for subsequent use to lubricate the system, e.g., during an interruption condition. Referring to FIG. 2, a portion of the lubricant after contacting the first mesh 112 between the first gear 102 and the second gear 104 may also flow through the flange 150 at the output shaft 136, e.g., a portion of the flow of lubricant indicated by arrows 140.

It is contemplated that a collector 108 of the present disclosure can be sized, e.g., have a desired volume, to store a specific amount of lubricant for a desired application depending on a requirement of a lubricant interruption time requirement. In other words, a collector 108 of the present disclosure can be sized, e.g., have a desired volume, for a variety of different applications. In an exemplary embodiment, the collector 108 allows the lubricant to be continuously recirculated back to the first mesh 112 between the first gear 102 and the second gear 104.

Next, a gear assembly 100 of the present disclosure is able to continuously release the stored flow of lubricant 140 within the collector 108 during an interruption condition of the primary lubrication system 130. During an interruption condition, the flow of lubricant 132 is interrupted from being provided to the supply opening 126 of the lubricant input portion 110 by the primary lubrication system 130. In other words, the primary lubrication system 130 is in communication with the gear assembly 100 and the primary lubrication system 130 is transitionable between a working condition in which the flow of lubricant 132 is provided to the supply opening 126 and an interruption condition in which the flow of lubricant 132 is interrupted from being provided to the supply opening 126.

The flow of lubricant indicated by arrows 142, e.g., the recovered flow 142, is recirculated from the collector 108 through the recirculation channel 160 and out the second supply opening 122 of the lubricant input portion 110 via a relative velocity between the third gear 106 and the carrier 144. In an exemplary embodiment of the present disclosure, the flow of lubricant indicated by arrows 142, e.g., the recovered flow 142, is continuously recirculated from the collector 108 through the recirculation channel 160 and out the second supply opening 122 of the lubricant input portion 110 via a relative velocity between the third gear 106 and the carrier 144. In other words, the collector 108 and the recirculation channel 160 of the present disclosure provide the flow of lubricant indicated by arrows 142, e.g., the recovered flow 142, to be recirculated out the second supply opening 122 of the lubricant input portion 110 to the first mesh 112 between the first gear 102 and the second gear 104 while the primary lubrication system 130 is in either the working condition or the interruption condition. In this manner, at times, the flow of lubricant indicated by arrows 142, e.g., the recovered flow 142, is recirculated from the collector 108 through the recirculation channel 160 and out the second supply opening 122 of the lubricant input portion 110 simultaneously with the first supply opening 126 of the lubricant input portion 110 providing the flow of lubricant 132 to the first mesh 112 between the first gear 102 and the second gear 104.

In an exemplary embodiment, the second supply opening 122 of the lubricant input portion 110 that injects recovered lubricant to the first mesh 112 between the first gear 102 and the second gear 104 is sized and configured to supply a minimum amount of lubrication to the first mesh 112 to avoid excessive heat generation, to supply minimum cooling to the first mesh 112, and/or to supply lubrication to the gear assembly 100 during the entire duration of the primary lubrication system 130 being in an interruption condition.

The gear assembly 100 of the present disclosure provides a flow of lubricant indicated by arrows 142, e.g., the recovered flow 142, to be recirculated from the collector 108 through the recirculation channel 160 and out the second supply opening 122 of the lubricant input portion 110 via a relative velocity between the third gear 106 and the carrier 144 during interruption conditions. In this manner, a gear assembly 100 of the present disclosure is able to continuously lubricate the gears 102, 104, 106 and meshes 112, 114 during an interruption condition of the primary lubrication system 130 without requiring additional parts, auxiliary systems, and/or tanks. In other words, a gear assembly 100 of the present disclosure utilizes a collector 108 to store and recirculate residual lubricant and takes advantage of a fluid dynamic field generated by the gears 102, 104 and a relative velocity between the third gear 106 and the carrier 144 to allow lubrication of the system during an interruption condition.

Referring to FIG. 3, in an exemplary embodiment, a gear assembly 100 of the present disclosure may include a plurality of recirculation channels 160 in communication with different portions of the collector 108. In this manner, the above described flow of lubricant indicated by arrows 142, e.g., the recovered flow 142, can be recirculated from the collector 108 through multiple recirculation channels 160 and out separate spaced apart second supply openings 122 to provide additional recovered lubricant at various mesh locations between second gears 104 and the first gear 102 of the present disclosure. For example, in one embodiment, a recirculation channel 160 may be located between each pair of adjacent second gears 104. In this manner, a gear assembly 100 of the present disclosure is able to utilize multiple portions of the collector 108 via separate recirculation channels 160 to provide recirculated lubrication to the system during an interruption condition.

FIG. 4 illustrates another exemplary embodiment of the present disclosure. The embodiment illustrated in FIG. 4 includes similar components to the embodiment illustrated in FIGS. 2-3, and the similar components are denoted by the same reference numbers. For the sake of brevity, these similar components and the similar steps of using a gear assembly 200 (FIG. 4) will not all be discussed in conjunction with the embodiment illustrated in FIG. 4.

Referring to FIG. 4, in an exemplary embodiment, a gear assembly 200 includes a lubricant input portion 210 that includes a single supply channel 228 having a supply opening 226. It is contemplated that the lubricant input portion 210 includes more than one supply opening 226 as shown in FIG. 4. The embodiment illustrated in FIG. 4 eliminates the need for the lubricant input portion 210 to have separate ducts and supply openings (FIG. 2), e.g., a first duct or supply channel 128 including a first supply opening 126 and a second duct or second channel 120 including a second supply opening 122.

In one exemplary embodiment, the lubricant input portion 210 may include a spraybar 210. In other exemplary embodiments, the lubricant input portion 210 may include other configurations and assemblies for supplying a lubricant to the gear assembly 200.

Referring to FIG. 4, in an exemplary embodiment, a gear assembly 200 of the present disclosure further includes a valve 270 that is operable between a first position in which the recirculation channel 160 is not in fluid communication with the supply opening 226 of the lubricant input portion 210 and a second position in which the recirculation channel 160 is in fluid communication with the supply opening 226 of the lubricant input portion 210. With the valve 270 in the second position, the flow of lubricant, e.g., a scavenger flow of lubricant indicated by arrows 140, collected within the collector 108 is recirculated through the recirculation channel 160, e.g., the flow of lubricant or recovered flow indicated by arrows 142, and out the supply opening 226 of the lubricant input portion 210 via a relative velocity between the third gear 106 and the carrier 144. It is contemplated that a valve 270 of the present disclosure may include any type of valve that can transition between a first and a second position as described herein.

In this manner, the valve 270 makes sure the recovered flow of lubricant 142 is only provided out the supply opening 226 of the lubricant input portion 210 with the primary lubrication system 130 in an interruption condition. For example, with the primary lubrication system 130 in the working condition, a pressure of the flow of lubricant 132 provided to the supply opening 226 maintains the valve 270 in the first position. Furthermore, with the primary lubrication system 130 in an interruption condition, the pressure of the flow of lubricant 132 provided to the supply opening 226 decreases thereby transitioning the valve 270 to the second position in which the recirculation channel 160 is in fluid communication with the supply opening 226 of the lubricant input portion 210 and the flow of lubricant, e.g., a scavenger flow of lubricant indicated by arrows 140, collected within the collector 108 is recirculated through the recirculation channel 160, e.g., the flow of lubricant or recovered flow indicated by arrows 142, and out the supply opening 226 of the lubricant input portion 210 via a relative velocity between the third gear 106 and the carrier 144.

It is contemplated that a gear assembly 100, 200 of the present disclosure may be used with aeronautical engines, e.g., such as airplane engines or helicopter engines, and also may be applied to other mechanical or electro-mechanical systems not shown herein. In some exemplary embodiments, a gear assembly 100, 200 generally shown and described herein may be produced using one or more manufacturing methods known in the art. For example, the gear assembly 100, 200, including, but not limited to, the gears 102, 104, 106, a collector 108, a recirculation channel 160, and/or a lubricant input portion 110 may be manufactured via one or more processes known such as additive manufacturing or 3D printing, machining processes, forgings, castings, etc., or combinations thereof. Still further, a lubricant input portion 110 may be formed into the gear assembly 100, such as via one or more of the processes described herein, or via a bonding process, e.g., welding, brazing, adhesive, bonding, etc., or mechanical fasteners, e.g., bolts, nuts, screws, rivets, tie rods, etc., or otherwise adhering a lubricant input portion 110 such as shown and described in the exemplary embodiments herein. Alternatively, or additionally, various components of the gear assembly 100, 200 may be formed via a material removal process, such as, but not limited to, a machining process, e.g., cutting, milling, grinding, boring, etc.

Further aspects of the invention are provided by the subject matter of the following clauses:

1. A gear assembly (100), comprising: a first gear (102) disposed at a centerline axis (12) of the gear assembly (100); a second gear (104) coupled to the first gear (102) in adjacent radial arrangement to form a first mesh (112) between the first gear (102) and the second gear (104); a third gear (106) coupled to the second gear (104) in adjacent radial arrangement to form a second mesh (114) between the second gear (104) and the third gear (106); a collector (108) rotatably coupled with the third gear (106); and a lubricant input portion (110) disposed between a portion of the first gear (102) and the second gear (104) such that a first supply opening (126) of the lubricant input portion (110) is directed at the first mesh (112) between the first gear (102) and the second gear (104), wherein the first supply opening (126) provides a flow of lubricant to the first mesh (112) between the first gear (102) and the second gear (104) and a portion of the flow of lubricant is collected by the collector (108).

2. The gear assembly (100) of any preceding clause, further comprising a recirculation channel (160) in communication with the collector (108) and the lubricant input portion (110).

3. The gear assembly (100) of any preceding clause, wherein the lubricant input portion (110) includes a second supply opening (122) directed at the first mesh (112) between the first gear (102) and the second gear (104), and wherein the recirculation channel (160) is in communication with the collector (108) and the second supply opening (122) of the lubricant input portion (110).

4. The gear assembly (100) of any preceding clause, wherein the second gear (104) is rotatably mounted to a carrier (144) via a bearing (146), wherein the carrier (144) is fixed with respect to the first gear (102), wherein the recirculation channel (160) is disposed within the carrier (144), and wherein the third gear (106) and the collector (108) are rotatable relative to the carrier (144).

5. The gear assembly (100) of any preceding clause, wherein the flow of lubricant collected within the collector (108) is continuously recirculated through the recirculation channel (160) and out the second supply opening (122) of the lubricant input portion (110) via a relative velocity between the third gear (106) and the carrier (144).

6. The gear assembly (100) of any preceding clause, further comprising a primary lubrication system (130) transitionable between a working condition in which the flow of lubricant is provided to the first supply opening (126) and an interruption condition in which the flow of lubricant is interrupted from being provided to the first supply opening (126), wherein during the interruption condition, the flow of lubricant collected within the collector (108) is recirculated through the recirculation channel (160) and out the second supply opening (122) of the lubricant input portion (110).

7. The gear assembly (100) of any preceding clause, further comprising an output shaft (136) coupled to the third gear (106), wherein the collector (108) is coupled to a portion of the output shaft (136).

8. The gear assembly (100) of any preceding clause, wherein the lubricant input portion (110) includes a first duct (128) having the first supply opening (126) and a second duct (120) having the second supply opening (122), wherein the first duct (128) and the second duct (120) are separate.

9. A gear assembly (200), comprising: a first gear (102) disposed at a centerline axis (12) of the gear assembly (200); a second gear (104) coupled to the first gear (102) in adjacent radial arrangement to form a first mesh (112) between the first gear (102) and the second gear (104); a third gear (106) coupled to the second gear (104) in adjacent radial arrangement to form a second mesh (114) between the second gear (104) and the third gear (106); a collector (108) rotatably coupled with the third gear (106); a lubricant input portion (210) disposed between a portion of the first gear (102) and the second gear (104) such that a supply opening (226) of the lubricant input portion (210) is directed at the first mesh (112) between the first gear (102) and the second gear (104); and a recirculation channel (160) in communication with the collector (108) and the lubricant input portion (210), wherein the supply opening (226) provides a flow of lubricant to the first mesh (112) between the first gear (102) and the second gear (104) and a portion of the flow of lubricant is collected by the collector (108).

10. The gear assembly (200) of any preceding clause, wherein the second gear (104) is rotatably mounted to a carrier (144) via a bearing (146), wherein the carrier (144) is fixed with respect to the first gear (102), and wherein the recirculation channel (160) is disposed within the carrier (144).

11. The gear assembly (200) of any preceding clause, further comprising a valve (270) operable between a first position in which the recirculation channel (160) is not in fluid communication with the supply opening (226) of the lubricant input portion (210) and a second position in which the recirculation channel (160) is in fluid communication with the supply opening (226) of the lubricant input portion (210) and the flow of lubricant collected within the collector (108) is recirculated through the recirculation channel (160) and out the supply opening (226) of the lubricant input portion (210) via a relative velocity between the third gear (106) and the carrier (144).

12. The gear assembly (200) of any preceding clause, further comprising a primary lubrication system (130) in communication with the gear assembly (200), the primary lubrication system (130) transitionable between a working condition in which the flow of lubricant is provided to the supply opening (226) and an interruption condition in which the flow of lubricant is interrupted from being provided to the supply opening (226).

13. The gear assembly (200) of any preceding clause, wherein with the primary lubrication system (130) in the working condition, a pressure of the flow of lubricant provided to the supply opening (226) maintains the valve (270) in the first position.

14. The gear assembly (200) of any preceding clause, wherein with the primary lubrication system (130) in the interruption condition, the pressure of the flow of lubricant provided to the supply opening (226) decreases thereby transitioning the valve (270) to the second position.

15. The gear assembly (200) of any preceding clause, wherein the second gear (104) is rotatably mounted to a carrier (144) via a bearing (146), and wherein the carrier (144) and the third gear (106) are rotating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gear assembly, comprising:
   a first gear disposed at a centerline axis of the gear assembly;
   a second gear coupled to the first gear in adjacent radial arrangement to form a first mesh between the first gear and the second gear;
   a third gear coupled to the second gear in adjacent radial arrangement to form a second mesh between the second gear and the third gear;
   a collector rotatably coupled with the third gear;
   a lubricant input portion disposed between a portion of the first gear and the second gear such that a first supply opening of the lubricant input portion is directed at the first mesh between the first gear and the second gear;
   a recirculation channel in communication with the collector and the lubricant input portion; and
   a valve operable between a first position in which the recirculation channel is not in fluid communication with the first supply opening of the lubricant input portion and a second position in which the recirculation channel is in fluid communication with the first supply opening of the lubricant input portion and a flow of lubricant collected within the collector is recirculated through the recirculation channel and out the first supply opening of the lubricant input portion via a relative velocity between the third gear and a carrier on which the second gear is rotatably mounted,
   wherein the first supply opening provides a flow of lubricant to the first mesh between the first gear and the second gear and a portion of the flow of lubricant is collected by the collector.

2. The gear assembly of claim 1, wherein the lubricant input portion includes a second supply opening directed at the first mesh between the first gear and the second gear, and wherein the recirculation channel is in communication with the collector and the second supply opening of the lubricant input portion.

3. The gear assembly of claim 2, wherein the second gear is rotatably mounted to the carrier via a bearing, wherein the carrier is fixed with respect to the first gear, wherein the recirculation channel is disposed within the carrier, and wherein the third gear and the collector are rotatable relative to the carrier.

4. The gear assembly of claim 3, wherein the flow of lubricant collected within the collector is continuously recirculated through the recirculation channel and 25 out the second supply opening of the lubricant input portion via a relative velocity between the third gear and the carrier.

5. The gear assembly of claim 4, further comprising:
   a primary lubrication system transitionable between a working condition in which the flow of lubricant is provided to the first supply opening and an interruption condition in which the flow of lubricant is interrupted from being provided to the first supply opening, wherein during the interruption condition, the flow of lubricant collected within the collector is recirculated through the recirculation channel and out the second supply opening of the lubricant input portion.

6. The gear assembly of claim 2, further comprising:
an output shaft coupled to the third gear,
wherein the collector is coupled to a portion of the output shaft.

7. The gear assembly of claim 2, wherein the lubricant input portion includes a first duct having the first supply opening and a second duct having the second supply opening, wherein the first duct and the second duct are separate.

8. A gear assembly, comprising:
a first gear disposed at a centerline axis of the gear assembly;
a second gear coupled to the first gear in adjacent radial arrangement to form a first mesh between the first gear and the second gear;
a third gear coupled to the second gear in adjacent radial arrangement to form a second mesh between the second gear and the third gear;
a collector rotatably coupled with the third gear;
a lubricant input portion disposed between a portion of the first gear and the second gear such that a supply opening of the lubricant input portion is directed at the first mesh between the first gear and the second gear; and
a recirculation channel in communication with the collector and the lubricant input portion,
wherein the supply opening provides a flow of lubricant to the first mesh between the first gear and the second gear and a portion of the flow of lubricant is collected by the collector,
wherein the second gear is rotatably mounted to a carrier via a bearing, wherein the carrier is fixed with respect to the first gear, and wherein the recirculation channel is disposed within the carrier, and
a valve operable between a first position in which the recirculation channel is not in fluid communication with the supply opening of the lubricant input portion and a second position in which the recirculation channel is in fluid communication with the supply opening of the lubricant input portion and the flow of lubricant collected within the collector is recirculated through the recirculation channel and out the supply opening of the lubricant input portion via a relative velocity between the third gear and the carrier.

9. The gear assembly of claim 8, further comprising:
a primary lubrication system in communication with the gear assembly, the primary lubrication system transitionable between a working condition in which the flow of lubricant is provided to the supply opening and an interruption condition in which the flow of lubricant is interrupted from being provided to the supply opening.

10. The gear assembly of claim 9, wherein with the primary lubrication system in the working condition, a pressure of the flow of lubricant provided to the supply opening maintains the valve in the first position.

11. The gear assembly of claim 10, wherein with the primary lubrication system in the interruption condition, the pressure of the flow of lubricant provided to the supply opening decreases thereby transitioning the valve to the second position.

12. The gear assembly of claim 8, wherein the second gear is rotatably mounted to a carrier via a bearing, and wherein the carrier and the third gear are rotating.

* * * * *